(12) United States Patent  
Derleth et al.

(10) Patent No.: US 6,482,082 B1  
(45) Date of Patent: Nov. 19, 2002

(54) HEATING AND/OR AIR-CONDITIONING SYSTEM FOR AN AUTOMOBILE AND METHOD OF MAKING SAME

(75) Inventors: Martin Derleth, Schonungen-Waldsachsen (DE); Klaus Luz, Herrenberg (DE); Adem Hizli, Stuttgart (DE); Markus Schmid, Wernau (DE); Martin Stemmler, Kassel (DE); Walter Wolf, Oppenweiler-Zell (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/197,665

(22) Filed: Nov. 23, 1998

(30) Foreign Application Priority Data

Nov. 21, 1997 (DE) .......................................... 197 51 652

(51) Int. Cl.⁷ ................................................. B60H 1/26
(52) U.S. Cl. ....................................... 454/156; 424/121
(58) Field of Search ................................. 454/121, 127, 454/144, 156; 180/90; 296/203.02, 208

(56) References Cited

U.S. PATENT DOCUMENTS 5,050,486 A * 9/1991 Arold et al. ................. 454/121
5,217,405 A * 6/1993 Tanaka ........................ 454/121
5,234,246 A * 8/1993 Henigue et al.
5,545,085 A   8/1996 Danieau
5,673,964 A * 10/1997 Roan et al. ............. 454/121 X
5,954,578 A * 9/1999 Takasaki ..................... 454/156
6,186,887 B1 * 2/2001 Dauvergne ................... 296/208

FOREIGN PATENT DOCUMENTS

| DE | 3940362 A1 | 6/1991 |
| DE | 4445380 A1 | 6/1996 |
| EP | 0566474 A1 | 10/1993 |
| FR | 2667829 A1 | 4/1992 |

OTHER PUBLICATIONS

Search Report, May 6, 1998, Germany.

* cited by examiner

Primary Examiner—Harold Joyce  
(74) Attorney, Agent, or Firm—Crowell & Moring LLP

(57) ABSTRACT

In a heating and/or air-conditioning system especially for an automobile with a blower housing and a distributor housing located in front of and below an instrument panel, provision is made such that the distributor housing can be separated toward the vehicle interior from the blower housing. The distributor housing has a front end facing the vehicle interior which fills a recess in the instrument panel provided for removing the distributor housing.

34 Claims, 3 Drawing Sheets

HEATING AND/OR AIR-CONDITIONING SYSTEM FOR AN AUTOMOBILE AND METHOD OF MAKING SAME

BACKGROUND AND SUMMARY OF THE INVENTION

The invention relates to a heating and/or air-conditioning system for a vehicle, especially for an automobile, with a blower housing preferably containing an evaporator, and with a distributor housing containing a heating body, said housings being located in the vicinity of an instrument panel.

Heating and/or air-conditioning systems are usually installed in vehicles in front of and below the instrument panel. For this reason, they can be accessed only with difficulty following initial installation for retrofitting with an evaporator or for replacing components, especially the heating body and evaporator. Extensive disassembly is required when such work is necessary. Usually, a mixing chamber is also located inside the instrument panel behind the distributor housing, from which chamber lines run to center nozzles, side nozzles, floor nozzles, and defroster nozzles as well as to lines that extend to the back of the vehicle.

It is known from European Patent Document EP-B 566 474 to mount a columnar mixing housing in the vehicle interior in front of a simplified, strip-shaped instrument panel. The distributor housing and the blower housing in this design are also located in front of and below the instrument panel so that heating bodies and evaporators are likewise accessible only with difficulty.

A goal of the invention is to design a heating and/or air-conditioning system of the species recited at the outset in such fashion that accessibility to the individual elements of this heating and/or air-conditioning system is improved, so that the disassembly work required for replacement or retrofitting with an evaporator is considerably reduced.

This goal is achieved by the distributor housing being separable from the blower housing in the direction of the vehicle interior and by providing that the distributor housing has a front end in the direction of the vehicle interior that fills a recess in the instrument panel provided for removal of the distributor housing.

Thus the invention provides that the front end of the distributor housing replaces the part of the instrument panel formed by the recess and projects slightly into the contour of the remaining part of the instrument panel. The distributor housing is thus accessible without disassembling the instrument panel and can be removed into the vehicle interior in a simple fashion after loosening the connection to the blower housing and loosening the connections to the heating body. The elements accommodated in the distributor housing are then easily accessible. The blower housing as well, after removal of the distributor housing, is readily accessible so that for example the evaporator located in the blower housing can be replaced. It is also possible to retrofit an evaporator in the blower housing, so that a heating system can be retrofitted to form an air-conditioning system.

In advantageous embodiments of the invention, provision is made for the front end to consist of elements molded on the distributor housing. As a result, the front end can be manufactured in simple fashion together with the distributor housing, especially as injection-molded parts.

In certain preferred embodiments of the invention, provision is made for the front end to be designed as an air-mixing device. This air-mixing device, which contains connections to the air nozzles and mixing flaps or the like that lead to the vehicle interior is thus integrated into the distributor housing and the front end. It is especially advantageous in this connection for the front end to be provided with air outlet stubs to which the center nozzles can be connected directly, which are then integrated into the front end.

Provision is made in preferred embodiments of the invention such that the front end is provided with at least one receptacle for an instrument or for operating elements. Thus the front end can serve as a holder for one or more instruments and especially for the operating elements of the heating and/or air-conditioning system, so that no special mounts for these parts need be provided in the instrument panel.

Provision is made in preferred embodiments of the invention such that the front end is covered by a surround that covers the gaps between the recess in the instrument panel and the front end of the distributor housing. This surround can be adapted in simple fashion to the design and/or color of the instrument panel so that a uniform appearance can be achieved in the vicinity of the instrument panel.

Provision is made in an advantageous improvement such that the surround is designed as a center console. Then the surround has a technical function as well as a decorative function.

Provision is made in preferred embodiments of the invention such that the front end is provided with electrical sockets to which the plugs of an instrument or an operating element can be connected. As a result the installation or removal of instruments, for example a radio or a navigation system or the like, can be accomplished in simple fashion. In an equally simple fashion, operating elements can be installed and removed, especially the operating elements for the heating and/or air-conditioning system.

Other objects, advantages and novel features of the present invention will become apparent from the following detailed description of the invention when considered in conjunction with the accompanying drawings.

DETAILED DESCRIPTION OF THE DRAWINGS

Figure 1:
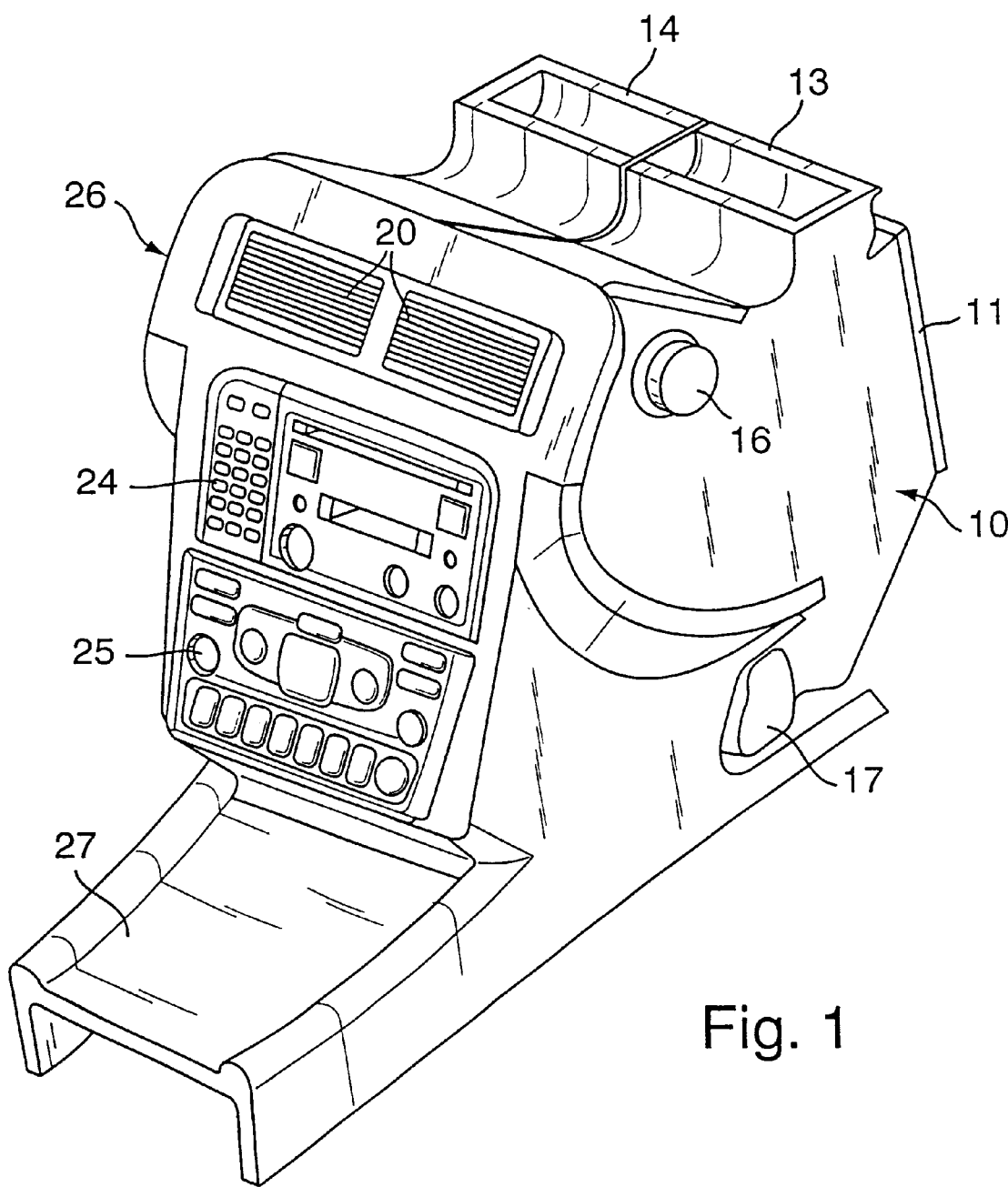
FIG. 1 shows a perspective view of a part of a heating and/or air-conditioning system according to the invention in the assembled state.
Figure 2:
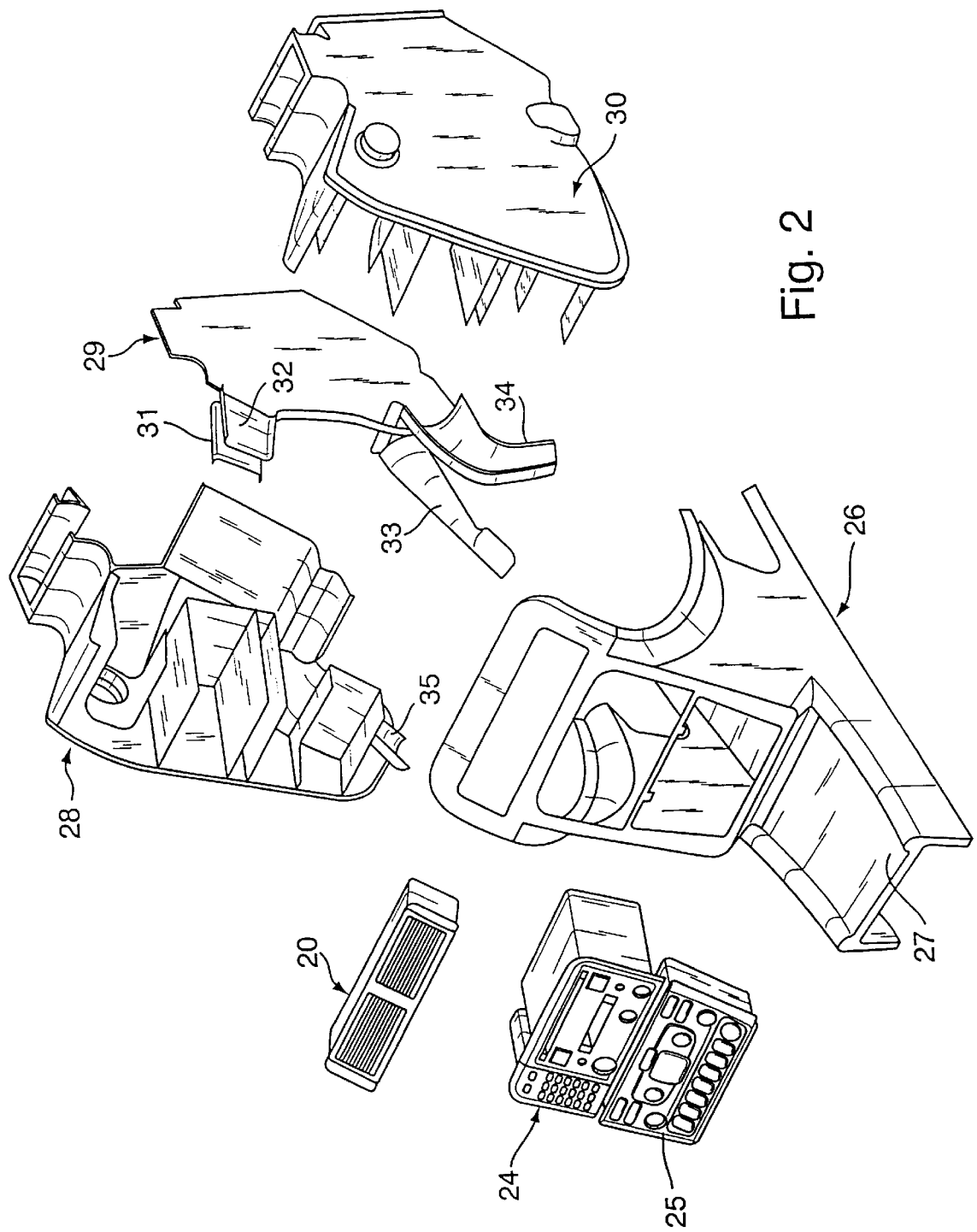
FIG. 2 is an exploded view of the elements of the part of the heating and/or air-conditioning system shown in FIG. 1.
Figure 3:
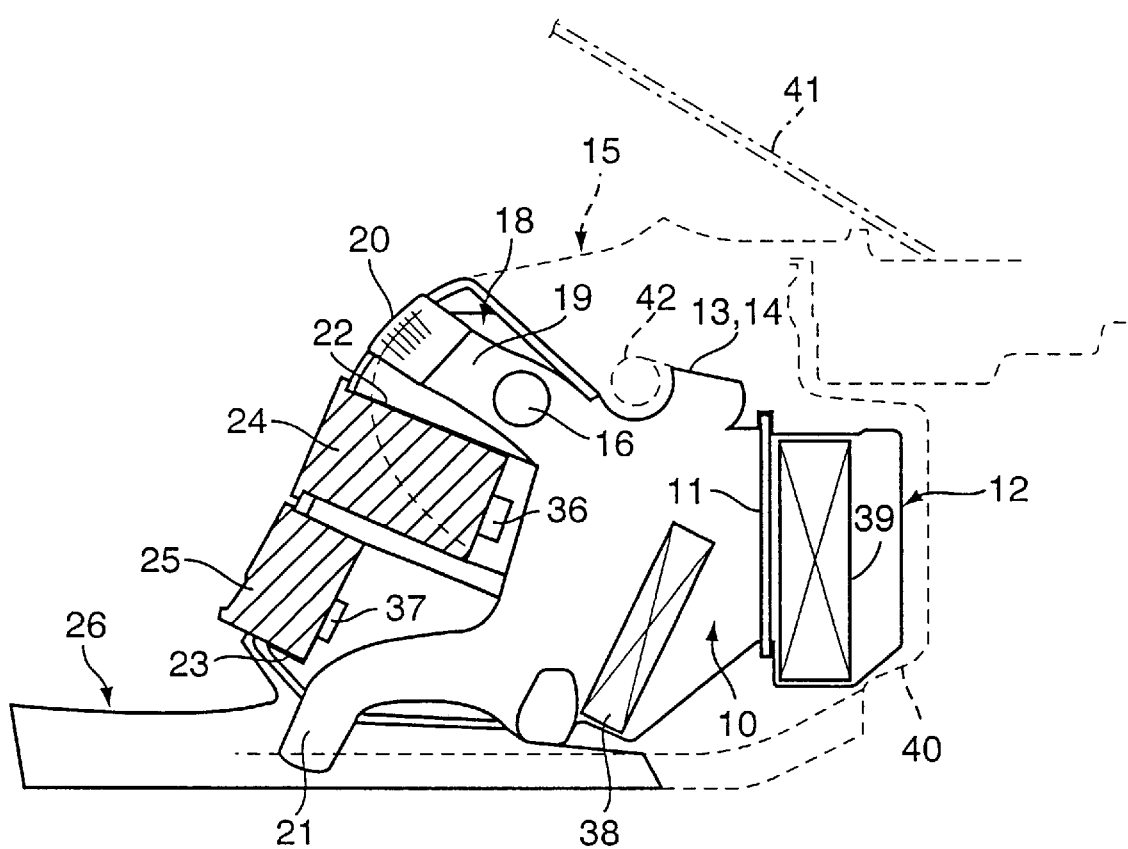
FIG. 3 is a lengthwise section shown in a schematic view through a heating and/or air-conditioning system according to the invention, installed in a vehicle.

The part of a heating and/or air-conditioning system shown in FIGS. 1 and 2, located in the lengthwise center of the vehicle, contains a distributor housing 10 that connects by a flange 11 with a blower housing 12, shown only in FIG. 3. Distributor housing 10 is made integral with an air-mixing device that has connections 13, 14 for defroster nozzles, which are located in an instrument panel 15, as shown in FIG. 3. The mixing device also has upper lateral connections 16, to which the side nozzles are linked by connecting lines, said lines being located in the vicinity of the two vehicle sides in instrument panel 15. In addition, lower connections 17 are provided that lead to floor nozzles in the foot area of the vehicle.

Distributor housing 10 is provided with a front end 18 that contains the air-mixing device and which extends up to the contour of the instrument panel 15 and beyond, as indicated in FIG. 3. Front end 18 contains two upper air ducts 19 to which central air nozzles 20 are connected directly. The front end also contains lower air ducts 21 that form connections for lines not shown that lead to the rear of the vehicle.

Front end 18 also contains receptacles 22, 23 that receive instruments or operating elements. In the embodiment, the upper receptacle 22 for example serves to receive a radio 24. The lower receptacle 23 serves for example to receive the operating elements for the heating and/or air-conditioning system, designed as a module 25 for example.

Front end 18 is covered by a surround 26 that forms the outer contour of a center console. The upper edges of surround 26 cover the recess in the instrument panel. They can be provided in a manner not shown with edge strips resembling sealing lips. Surround 26 also has window-like recesses for center nozzles 20, for radio 24 and module 25 of the operating elements. In addition, a shelf 27 that extends into the passenger compartment between the driver and passenger is formed on surround 26, and is advantageously made as an injection-molded plastic part. The surround also extends forward below instrument panel 15 so that it forms a center console in the middle of the vehicle.

As can be seen from FIG. 2, distributor housing 10 including the front end consists of three molded plastic parts, namely a left part 28, a middle part 29, and a right part 30 that is the mirror image of the left part. The left and right parts 28, 30 are connected in known fashion by tongue-and-groove connections with middle part 29. Projections 31 are formed on middle part 29 that form air ducts 19 that lead to center nozzles 20 together with associated molded parts of the sides. Additional shell-shaped projections 33, 34 are molded on middle part 29 which together with projections 35 of side parts 29, 30 form ducts 21 for connecting the lines for the rear area.

Receptacles 22, 23 are formed of ribs that project from side parts 28, 30, which ribs can abut one another, but need not do so. The surround that covers the front end is a molded plastic part that is equipped with window-like recesses for center nozzles 20, radio 24, and module 25 of the operating elements. Preferably provision is made such that receptacles 22, 23 merely receive the corresponding elements, while securing in position and locking to surround 26 are performed by suitable latches.

As can be seen from FIG. 3, electrical sockets 36, 37 are provided on receptacles 22, 23, by which sockets radio 24 and module 25 of operating elements are connected electrically when they are placed in the corresponding receptacles 22, 23.

Distributor housing 10 contains a heat-transfer device that serves as a heating body 38, said device being connected in a manner not shown in greater detail by means of separable connections to the coolant circuit of an internal combustion engine of the motor vehicle. Blower housing 12, if an air-conditioner is involved, contains a heat-transfer device designed as an evaporator 39 connected to a coolant circuit. Blower housing 12 is provided with a flange by which it is connected in a sealing fashion with flange 11 of distributor housing 10. For example, the flange of blower housing 12 has hook-shaped fastening elements that engage the upper area of flange 11 of distributor housing 10. In the remaining area the two flanges can be connected together in sealing fashion by clamps or screws.

Blower housing 12 is located in a fixed position in the vehicle, of which a firewall 40 and a windshield 41 are indicated in addition to instrument panel 15. Distributor housing 30 with front end 18 and the installed elements is fastened for example to a transverse member 42 of the vehicle, said member being located in the vicinity of connections 13, 14 for the defroster nozzles. After the connections to blower housing 12 are loosened and after the connections to transverse member 42 are loosened, distributor housing 10 together with front end 18 and elements 20, 24, 25 connected thereto along with surround 26 can be removed from instrument panel 15 in the direction of the vehicle interior of the vehicle, not shown in greater detail. Of course, connections for heating as well as to the side nozzles, floor nozzles, and rear nozzles must be disconnected beforehand. In addition, fastening means for the surround that serves as a center console may also have to be loosened. However these tasks are relatively simple to perform so that the effort involved in disassembly is appropriately low. After the assembly consisting of distributor housing 10 and front end 18 has been removed, not only are the elements of these assemblies accessible for maintenance or replacement, but blower housing 12 is also accessible. It is then relatively simple to replace evaporator 39 or possibly to install an evaporator 39 for the first time in order to retrofit a heating system into an air-conditioning system.

Of course, the invention is not limited to the embodiment shown. Front end 18 can contain other receptacles for all the instruments for example so that instrument panel 15 has no mounts and largely must perform only a protective function for the vehicle occupants. Moreover. it is also possible to design surround 26 differently. In particular, it is possible to provide a lateral projection in the surround with respect to air nozzles 20 and radio 24 which serves for example as a glove compartment or as a device to receive an airbag. Since front end 18 of distributor housing 10 is covered by surround 26 to hide it from the passenger compartment of a vehicle, the front end can also be designed as a frame or lattice structure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Heating and/or air-conditioning system for an automobile, with a blower housing containing an evaporator and with a distributor housing containing a heating body, said housings being located in use in a vicinity of a vehicle instrument panel, wherein the distributor housing can be detachably separated from the blower housing at a connecting flange in a direction of a vehicle interior, and wherein the distributor housing has a front end facing the vehicle interior which in use extends up to a contour of the instrument panel and fills a recess in the instrument panel for accommodating detaching of the distributor housing at the connecting flange for removal from the blower housing into the vehicle interior, wherein the recess is open to the vehicle interior, wherein the instrument panel covers the distributor housing, and wherein the front end of the distributor housing is covered by a surround having a front face directed to the vehicle interior and edges covering the recess.

2. Heating and/or air-conditioning system according to claim 1, wherein the front end consists of elements molded on the distributor housing.

3. Heating and/or air-conditioning system according to claim 1, wherein the front end is designed as an air-mixing device.

4. Heating and/or air-conditioning system according to claim 1, wherein the front end is provided with air outlet stubs to which center nozzles can be connected directly.

5. Heating and/or air-conditioning system according to claim 2, wherein the front end is provided with air outlet stubs to which center nozzles can be connected directly.

6. Heating and/or air-conditioning system according to claim 3, wherein the front end is provided with air outlet stubs to which center nozzles can be connected directly.

7. Heating and/or air-conditioning system according to claim 1, wherein the front end is provided with air outlet stubs to which lines leading to the rear of the vehicle can be connected.

8. Heating and/or air-conditioning system according to claim 2, wherein the front end is provided with air outlet stubs to which lines leading to the rear of the vehicle can be connected.

9. Heating and/or air-conditioning system according to claim 3, wherein the front end is provided with air outlet stubs to which lines leading to the rear of the vehicle can be connected.

10. Heating and/or air-conditioning system according to claim 4, wherein the front end is provided with air outlet stubs to which lines leading to the rear of the vehicle can be connected.

11. Heating and/or air-conditioning system according to claim 1, wherein the front end is provided with at least one receptacle for an instrument or for operating elements.

12. Heating and/or air-conditioning system according to claim 1, wherein the surround covers gaps between the recess in the instrument panel and the front end of the distributor housing.

13. Heating and/or air-conditioning system according to claim 12, wherein the surround is designed as a center console.

14. Heating and/or air-conditioning system according to claim 1, wherein the front end is provided with electrical sockets to which the plugs of an instrument or an operating element can be connected.

15. Heating and/or air-conditioning system according to claim 1, wherein the distributor housing and the front end are assembled from injection-molded plastic parts designed as two side parts and a middle part.

16. An automobile assembly comprising:
an instrument panel disposed in a front vehicle body section and facing a vehicle passenger space, and
an air-conditioner blower housing and an air-conditioner distributor housing located in a vicinity of the instrument panel,
wherein the distributor housing has a front end portion which extends up to a contour of the instrument panel and fills a recess in the instrument panel, and is configured to be detachably separated from the blower housing in a direction of the vehicle passenger space,
wherein the recess is open to the vehicle passenger space,
wherein the instrument panel covers the distributor housing, and
wherein the front end portion of the distributor housing is covered by a surround having a front face directed to the vehicle passenger space and edges covering the recess.

17. An automobile assembly according to claim 16, wherein an evaporator is disposed in the blower housing, and
wherein a heating body is disposed in the distributor housing.

18. An automobile assembly according to claim 17, wherein the front end portion consists of elements molded on the distributor housing.

19. An automobile assembly according to claim 17, wherein the front end portion is designed as an air-mixing device.

20. An automobile assembly according to claim 17, wherein the front end portion is provided with air outlet stubs to which center nozzles can be connected directly.

21. An automobile assembly according to claim 17, wherein the front end portion is provided with air outlet stubs to which lines leading to the rear of the vehicle can be connected.

22. An automobile assembly according to claim 17, wherein the front end portion is provided with at least one receptacle for an instrument or for operating elements.

23. An automobile assembly according to claim 17, wherein the surround covers gaps between the recess in the instrument panel and the front end portion of the distributor housing.

24. An automobile assembly according to claim 23, wherein the surround is designed as a center console.

25. An automobile assembly according to claim 17, wherein the front end portion is provided with electrical sockets to which the plugs of an instrument or an operating element can be connected.

26. An automobile assembly according to claim 17, wherein the distributor housing and the front end portion are assembled from injection-molded plastic parts designed as two side parts and a middle part.

27. A method of making an automobile assembly comprising:
an instrument panel disposed in a front vehicle body section and facing a vehicle passenger space, and
an air-conditioner blower housing containing an evaporator and an air-conditioner distributor housing containing a heating body located in a vicinity of the instrument panel, said instrument panel covering the distributor housing,
said method including:
detachably connecting the distributor housing to the blower housing at a connecting flange with a front end portion of the distributor housing extending up to a contour of the instrument panel and filling a recess in the instrument panel which is open to the vehicle passenger space, such that the distributor housing is detachably separable from the blower housing at the connecting flange to be removed from the blower housing in a direction of the vehicle passenger space, and
covering the front end portion of the distributor housing by a surround having a front face directed to the vehicle passenger space and edges covering the recess.

28. A method according to claim 27, wherein an evaporator is disposed in the blower housing, and
wherein a heating body is disposed in the distributor housing.

29. A method according to claim 28, wherein the surround covers gaps between the recess in the instrument panel and the front end portion of the distributor housing.

30. A method according to claim 29, wherein the surround is designed as a center console.

31. A method according to claim 27, wherein the distributor housing and the front end portion are assembled from injection-molded plastic parts designed as two side parts and a middle part.

32. Heating and/or air conditioning system for an automobile according to claim 1, wherein the distributor housing, when in an assembled in use position, projects from behind the instrument panel to a position in front of the instrument panel.

33. An automobile assembly according to claim 16, wherein the distributor housing, when in an assembled in use position, projects from behind the instrument panel to a position in front of the instrument panel.

34. A method according to claim 27, wherein the distributor housing, when in an assembled in use position, projects from behind the instrument panel to a position in front of the instrument panel.

\* \* \* \* \*